United States Patent [19]

Kobayashi et al.

[11] Patent Number: 5,212,612
[45] Date of Patent: May 18, 1993

[54] MAGNETIC HEAD

[75] Inventors: Hiroshi Kobayashi; Hiroshi Yamamoto; Kazunori Inoue, all of Amagasaki; Hideo Kimura, Nagaokikyo, all of Japan

[73] Assignee: Mitsubishi Denki Kabushiki Kaisha, Japan

[21] Appl. No.: 651,133

[22] Filed: Feb. 6, 1991

[30] Foreign Application Priority Data

Feb. 7, 1990 [JP] Japan .................................. 2-29158

[51] Int. Cl.⁵ .............................................. G11B 5/235
[52] U.S. Cl. ..................................... 360/119; 360/120; 360/122
[58] Field of Search ......... 360/119, 120, 122, 125–126

[56] References Cited

U.S. PATENT DOCUMENTS

| 4,701,819 | 10/1987 | Inagoya et al. | 360/122 |
| 4,755,899 | 7/1988 | Kobayashi et al. | 360/119 X |
| 4,811,146 | 3/1989 | Niwa | 360/119 |
| 4,985,796 | 1/1991 | Ihara et al. | 360/122 |

FOREIGN PATENT DOCUMENTS 62-157306  7/1987  Japan .................................. 360/119

Primary Examiner—John H. Wolff
Attorney, Agent, or Firm—Wolf, Greenfield & Sacks

[57] ABSTRACT

A metal-in-gap head wherein one of a pair of magnetic core halves is coated with a metal film on the side of a gap between the magnetic core halves, a boundary between the metal film and core material to be coated with a metal film and core material to be coated with a metal film being rendered not parallel to the gap.

19 Claims, 19 Drawing Sheets

MAGNETIC HEAD

BACKGROUND OF THE INVENTION

1. Field of the Invention

This invention relates to a magnetic head for analog recording of video images in a home VTR such as S-VHS, high definition video system, etc.

2. Description of Related Art

It has been a recent trend in a home VTR to record digital signals in a wider band of frequencies for the purpose of improving the image quality. For example, the central frequency of a luminance signal has been changed from 4.3 MHz to 6.5 MHz (S-VHS) in the VHS format.

In consequence, recording has been made with high density with the shortest recording wavelength of 1 μm or shorter. So that the coercive force of a recording medium has been increased and a magnetic head has been formed with a narrower gap. On the other hand, a playback output in a lower frequency by the home VTR (the central frequency of a color signal is 0.829 MHz in S-VHS) holds the key of recording since the color signal is superimposed upon a luminance signal for recording. Perfect recording could not be expected in a conventional ferrite head having a narrow gap, and a sufficient playback output was not obtained in the lower frequency. With respect to this problem, a metal-in-gap head (referred to as a "MIG head" hereinafter) has brought in use, which has a metal film with high saturation flux density, such as Co amorphous or sendust only in the vicinity of the gap of the MIG head where the magnetic saturation easily occurs in recording, while the most of the core of the MIG head is formed of ferrite. FIG. 1 is a plan view of the rubbing plane in touch with a magnetic tape, of a conventional MIG head and disclosed in Japanese Patent Application Laid Open No. 60-95704. In FIG. 1, a reference numeral represents a gap a reference numeral 2, a metal film having high saturation flux density and formed of, e.g., Co amorphous or sendust, a reference numeral 3 a magnetic core half formed of a magnetic compact with high permeability, for example, Mn-Zn ferrite, and a reference numeral 4 a bonding glass.

FIGS. 2 and 3 show plan views of the rubbing plane of a conventional MIG head disclosed in Japanese Patent Application Laid Open Nos. 60-32107 and 58-1820, respectively. These MIG heads are effective particularly to a high-coercivity medium (having the coercive force of about 1500 Oe) such as a metal particle tape but sufficiently effective to an S-VHS tape (having the coercive force of about 900 Oe).

According to the S-VHS system, the relative speed between the head and the magnetic tape is 5.8 m/s, the maximum recording frequency is approximately 8 MHz where the wavelength is about 0.73 μm. However, in such a short wavelength as above, the spacing loss easily influences the head. Due to the difference in the wear characteristics against the tape between the ferrite and the metal film, the surface of the metal film 2 becomes hollow relative to the magnetic core halves 3 formed of ferrite, thereby generating a spacing d, as shown in FIG. 1. When the metal film 2 is formed of sendust, the actual spacing d is about 200 Å. The spacing loss Ls is expressed by a following equation (1);

$$Ls = 54.6(d/\lambda) \ (dB) \quad (1)$$

wherein d is the spacing between the head and tape, and λ is the wavelength. Accordingly, the spacing loss Ls is about 1.5 dB.

Moreover, the thermal coefficient of the metal film 2 is greatly different from that of the ferrite. Therefore, when the metal film 2 is several tens μm thick, the metal film easily separates from the magnetic core halves.

The track width is approximately equal to the film thickness of the metal film 2 in the MIG heads with the structure shown in FIGS. 1 and 2. Accordingly, it is difficult to produce the head with good yield when the film thickness should be about 50 μm for a head, e.g., in the standard mode of the S-VHS (58 μm track pitch).

On the other hand, although the film thickness of the metal film 2 is not dependent on the track width in the structure of the MIG head indicated in FIG. 3, the boundary between the ferrite and metal film 2 functions as a pseudogap, that is, a pseudogap effect, allowance of the pseudogap is little in analog recording, and therefore it is practically difficult to mass-produce the head.

SUMMARY OF THE INVENTION

This invention has been devised to solve the above-described drawbacks in the prior art.

An essential object of this invention is to provide a magnetic head designed to inhibit the spacing loss in a high frequency, fit for mass-production irrespective of the track width and highly efficient in playback outputs.

The above and further objects and features of the invention will more fully be apparent from the following detailed description with accompanying drawings.

DESCRIPTION OF THE PREFERRED EMBODIMENT

Figure 5:
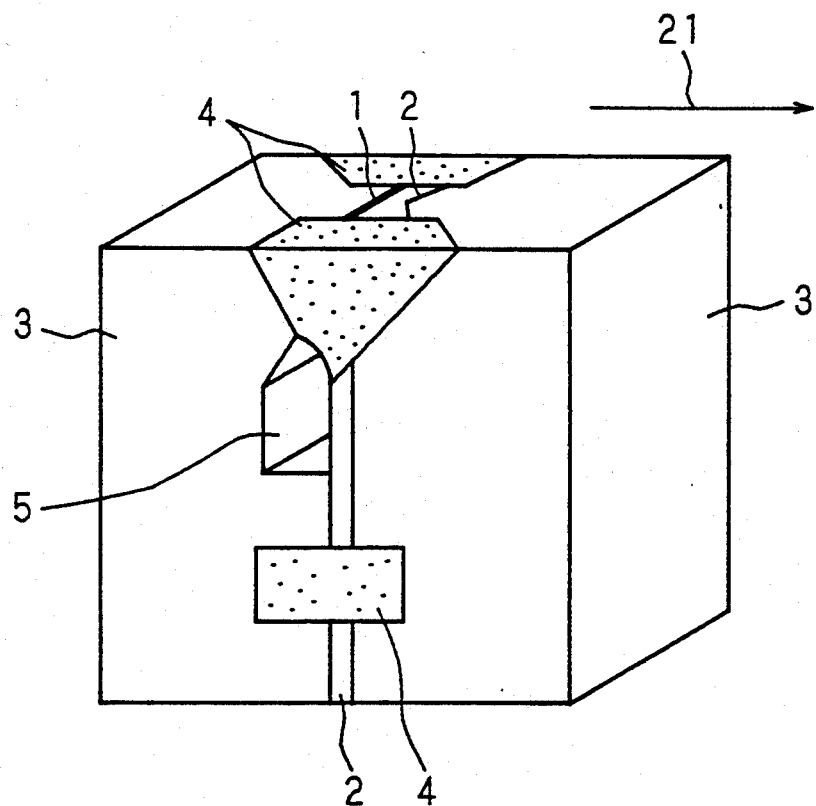
FIG. 5 is a front perspective view of a magnetic head according to this invention.
Figure 6:
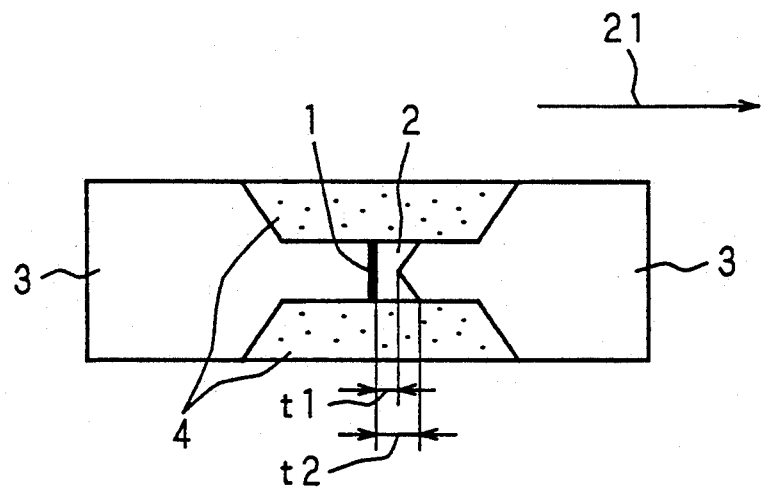
FIG. 6 is a plan view of the magnetic head of this invention.

One preferred embodiment of a magnetic head according to this invention will be discussed hereinafter with reference to the accompanying drawings. FIG. 5 is a front perspective view of a magnetic head of this invention, and FIG. 6 is a plan view of the rubbing plane to be in touch with a magnetic tape, of the magnetic head. In FIGS. 5 and 6, a reference numeral 21 indicates the running direction of the magnetic tape. A pair of magnetic core halves 3,3 are formed of magnetic compact having high permeability such as, for example, Mn-Zn ferrite. Each magnetic core half 3 is protruding at the central part in a widthwise direction of the side surface thereof confronting to the other magnetic core half 3. As is clear from FIG. 6, an end face of the protruding portion of the magnetic core half 3 provided at the leading side of the magnetic tape is flat, whereas an end face of the protruding portion of the other magnetic core half S provided at the trailing side of the magnetic tape is wedge-like. The end face alone, except the side face, of the protruding portion of the magnetic core half provided at the trailing side of the magnetic tape is coated with a metal film 2 having high saturation flux density, for example, Co amorphous or sendust. An $SiO_2$ film is interposed as a gap member between the protruding portion of the core half at the leading side and the metal film Z of the core half at the trailing side, thereby forming a very minute gap 1 between the core halves. Since the metal film 2 on the side of the gap 1 is flat but that on the side of the protruding portion is in contact with the end face of the wedge-like protruding portion, the thickness of the metal film 2 is the thinnest in the mid section and the thickest at both ends. That is, the boundary surface between the metal film 2 and the protruding portion of the magnetic core half is not parallel to the plane of the gap 1. In this embodiment, let t1 be the film thickness of the metal film 2 at the thinnest portion thereof, and t2 be that at the thickest portion. The magnetic core halves 3,3 are bonded by bonding glass 4. A window 5 for a wire is open in the central part piercing from the front surface to the rear surface of the magnetic head.

A method for producing the magnetic head in the above-discussed structure will be explained below.

Figure 7:
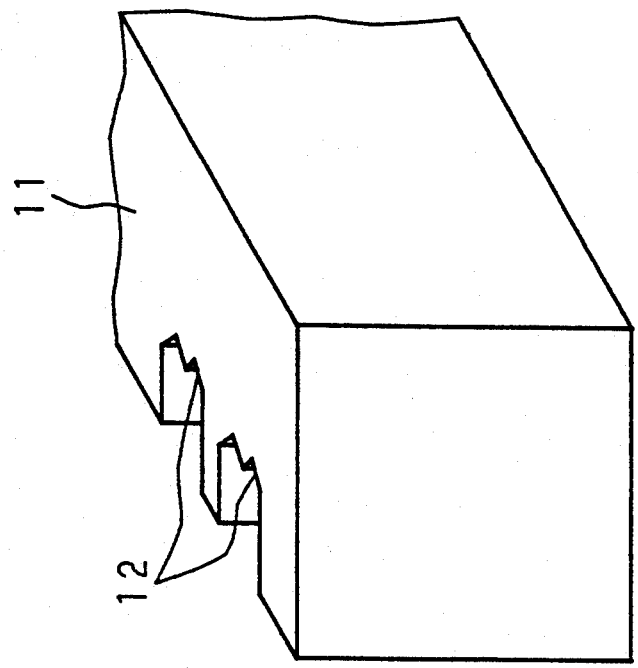
FIG. 7 through FIG. 12 are perspective views explanatory of the manufacturing processes of the magnetic head of this invention.
Figure 7:
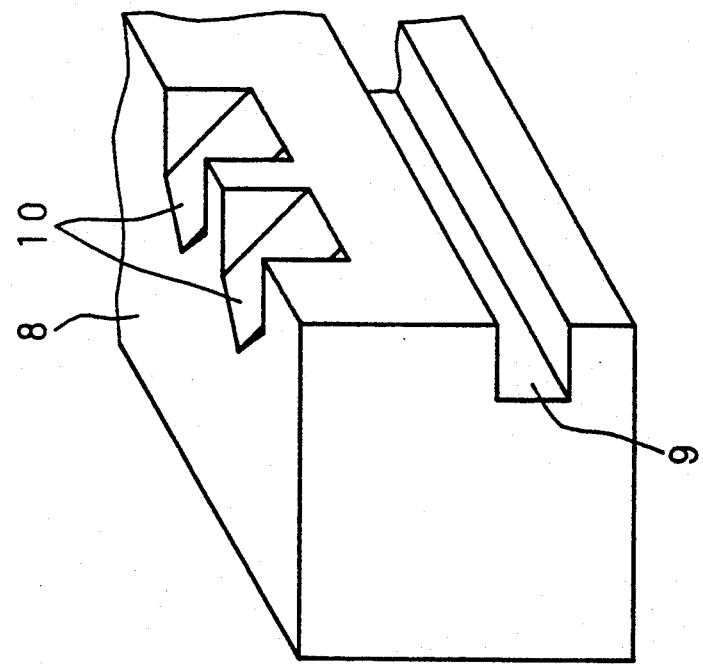
Figure 8:
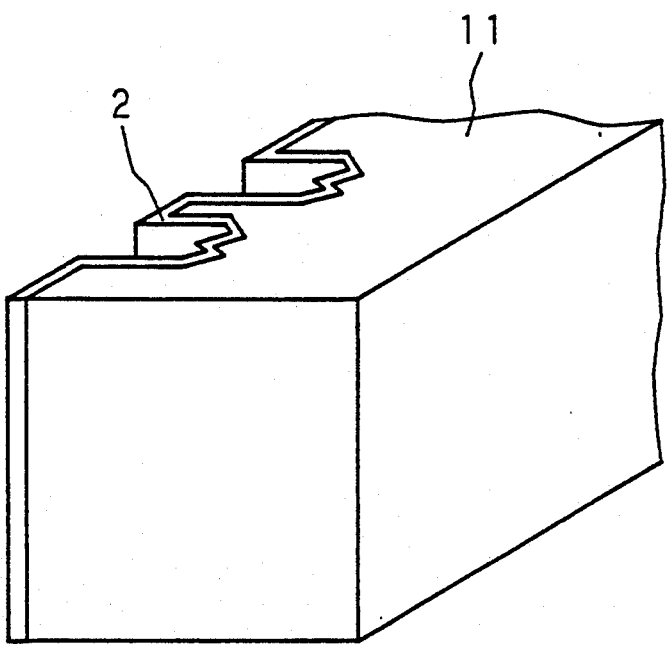

Referring to FIG. 7, a glass-bonding groove 9 for bonding a rear gap and a groove 10 for restricting the width of a track is machined by a rotary wheel in a ferrite block half 8 at the leading side of the magnetic tape. On the other hand, a groove 12 to be coated with the metal film 2 (a groove for making the boundary of the metal film and ferrite not parallel with the gap) is machined by an angle rotary wheel in another ferrite block half 11 at the trailing side of the magnetic tape. An $SiO_2$ film as an intermediate film, 100 Å thick is formed on the groove 12 of the ferrite block half 11 as shown in FIG. 8, and further the metal film 2, approximately 15 μm thick, is formed thereon.

Figure 9:
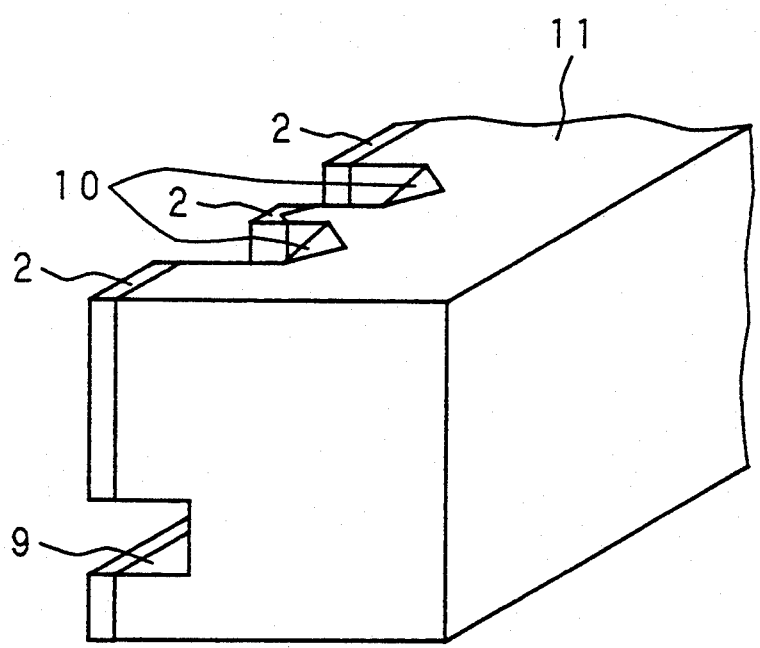
Figure 10:
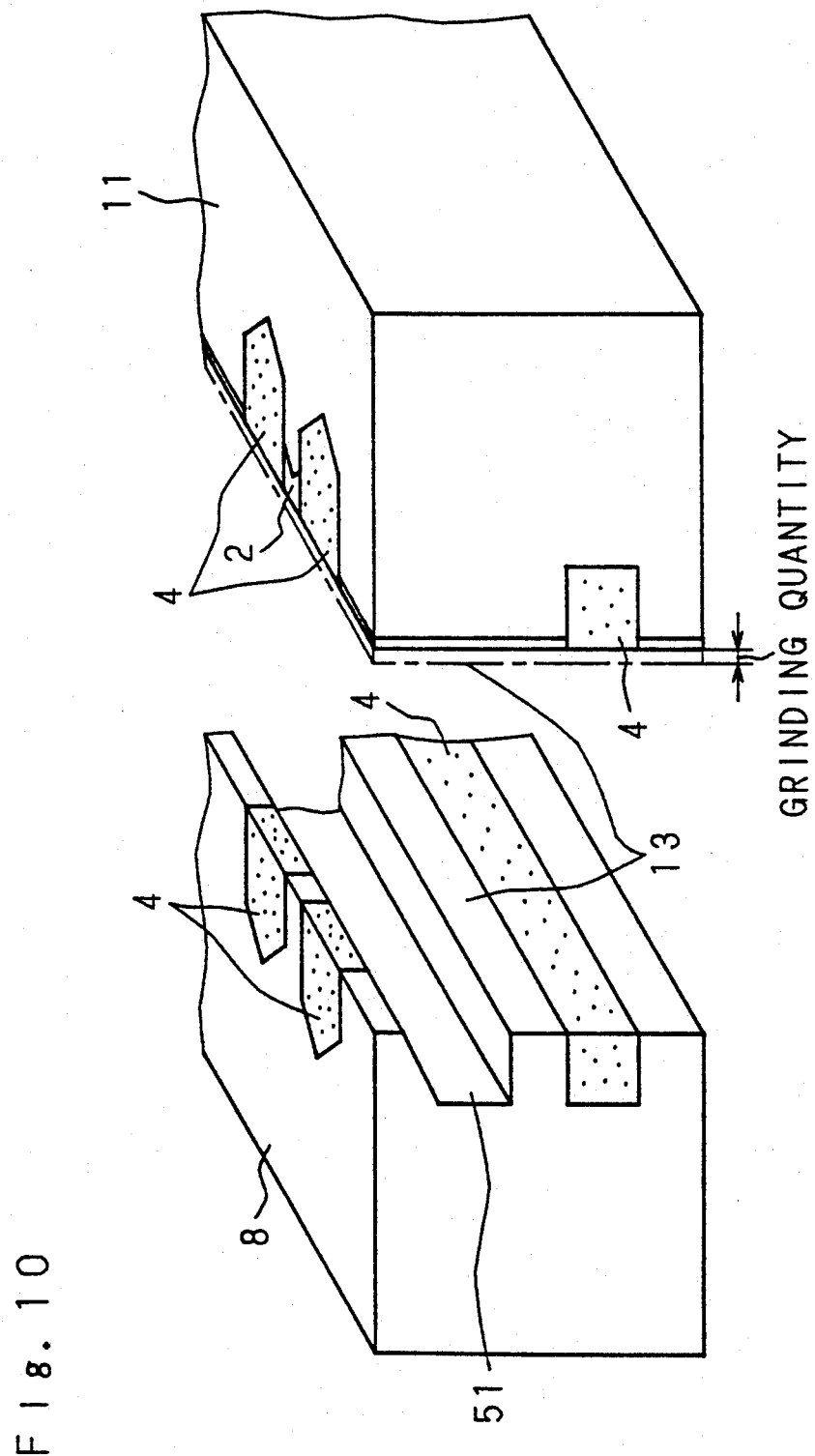

Then, as indicated in FIG. 9, a groove 10 is processed in the ferrite block half 11 with the same pitch as the groove 10 formed in the ferrite block half 8, and the metal film 2 at the side surface of the groove is removed, and a glass-bonding groove 9 is formed in the ferrite block half 11. Subsequently, as shown in FIG. 10 bonding glass 1 is molded into the grooves 9, 10 of the ferrite block halves 8, 11, and a window 61 for a wire is machined by a rotary wheel in the ferrite block half 8, a butt surface 13 against the gap is ground with accuracy. Since the grinding quantity determines the minimum thickness t1 of the metal film 2, it is preferable to grind not smaller than 3 μm, desirably not smaller than 6 μm.

Figure 11:
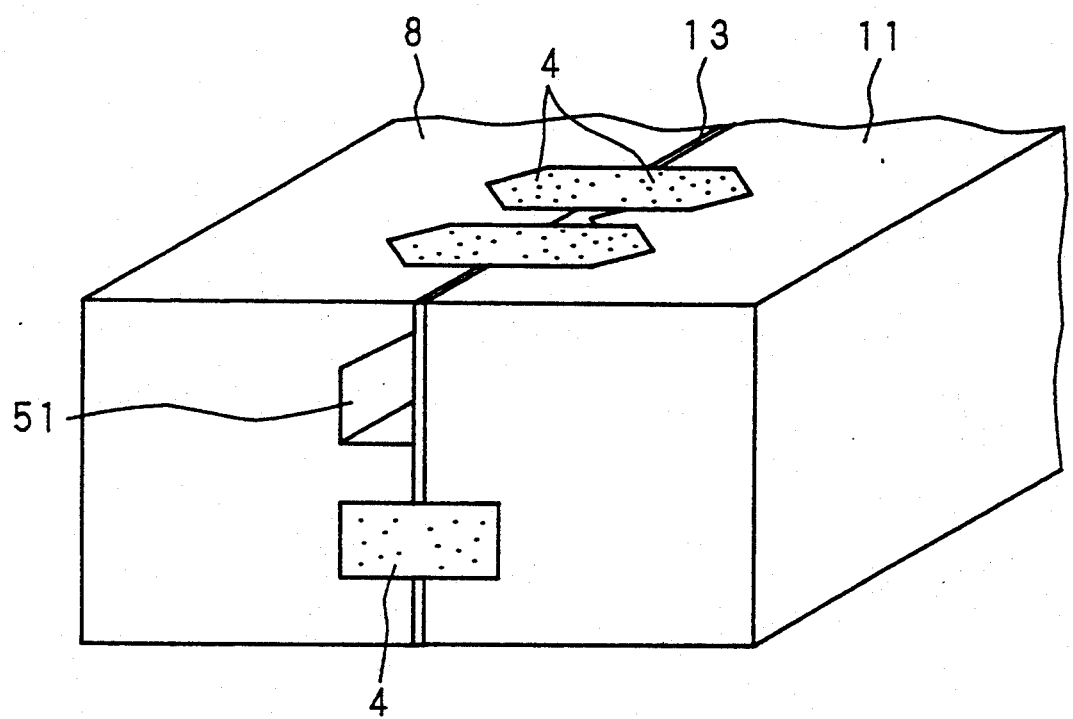
Figure 12:
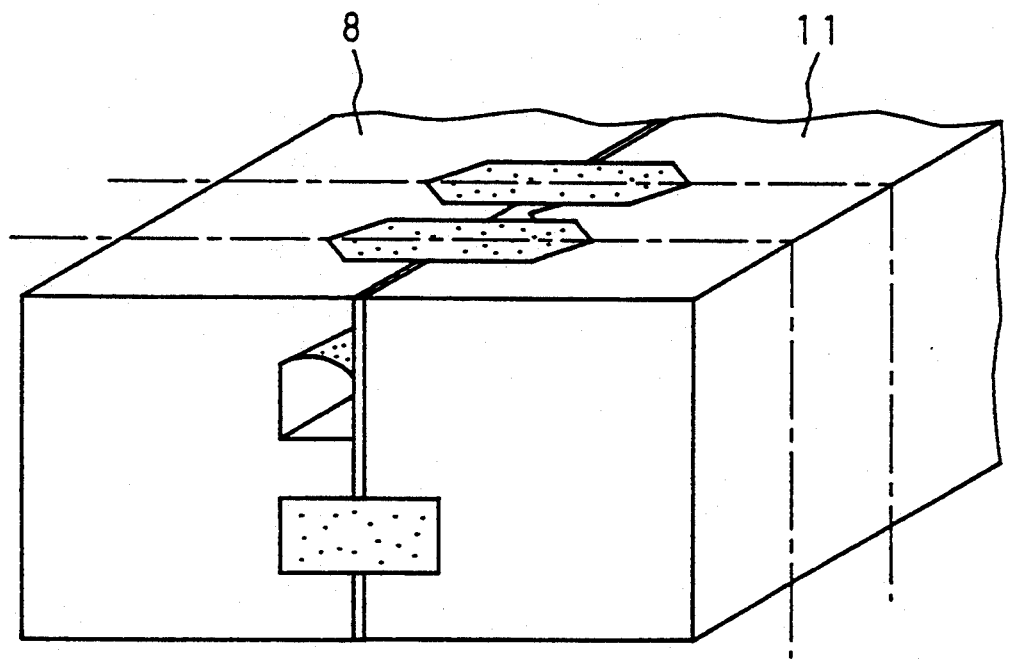

An $SiO_2$ film as a gap member is formed in a predetermined thickness on the butt surface 13 of the block halves 8, 11 against the gap, and the block halves 8, 11 are brought to butt against each other as shown in FIG. 11 and bonded at a predetermined temperature by the softened bonding glass 4. The bonding temperature is preferable not higher than 510° C. so as not to produce a pseudogap. Lastly, the bonded ferrite block halves 8, 11 are cut at a predetermined azimuth angle as shown by a two-dot chain line in FIG. 12, whereby the head core of FIG. t is obtained.

The groove 12 to be coated with the metal film Z is machined by an angle rotary wheel so as to be wedge-like according to the foregoing embodiment, but the shape of the groove 12 may be different so long as the surface of the metal film 2 after grinding becomes not parallel to the butt surface 13. However, it is not preferable that the right and left portions of the upper surface of the metal film 2 are rendered excessively asymmetric.

It is needless to say that the configuration and working procedure of the glass-bonding groove 9 may not be the same as in the above-described embodiment.

Moreover, although the thickness of the intermediate film and metal film Z are respectively 100 Å and 15 μm in the above embodiment, the former is enough to be from 50 to 200 Å and the later is enough to be not thinner than 3 μm. These films may be formed by a thin-film method such as sputtering, deposition, CVD, etc. Since the sendust and amorphous are easy to generate bubbles in the glass through reaction with the bonding glass 4, a Cr or $SiO_2$ film for preventing the reaction may be formed on the groove 10 after the groove 10 is formed.

Figure 1:
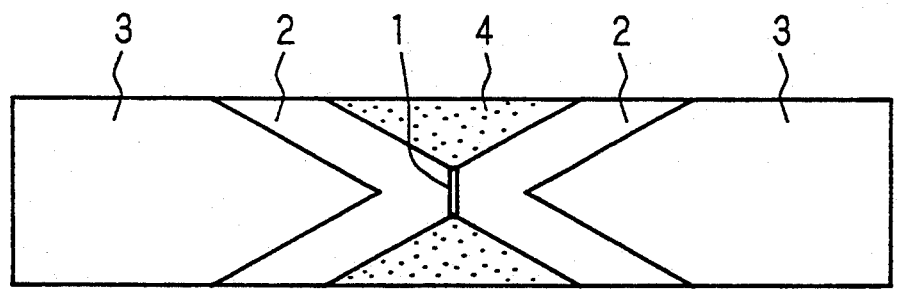
FIG. 1, FIG. 2 and FIG. 3 are plan views of the rubbing plane in touch with a magnetic tape, of a conventional magnetic head.
Figure 2:
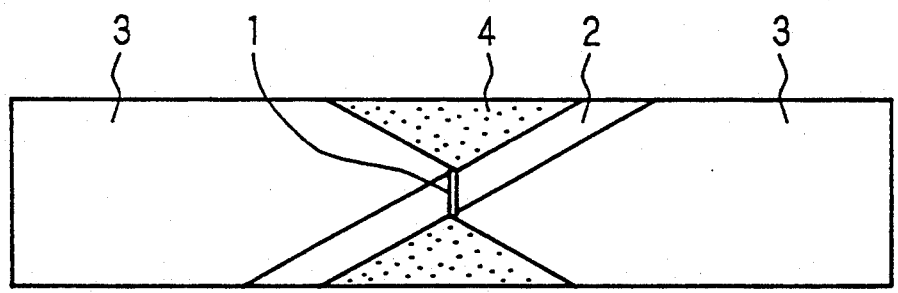
Figure 3:
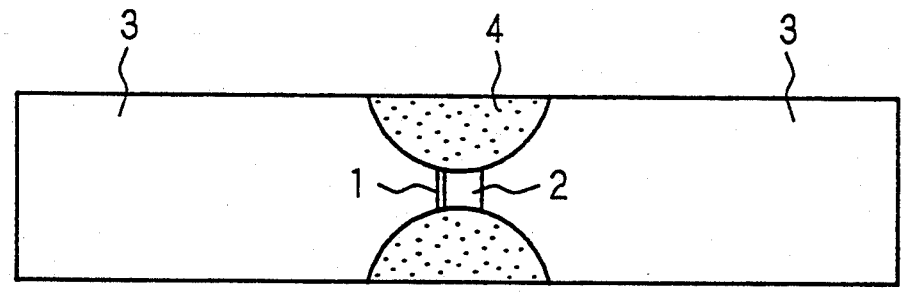
Figure 4:
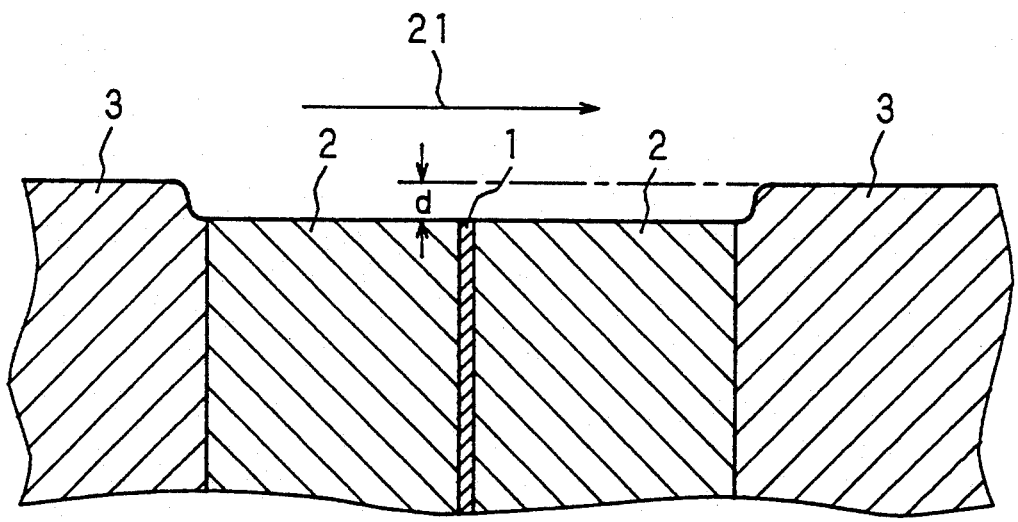
FIG. 4 is a side sectional view showing the state where the conventional magnetic head is worn.
Figure 13:
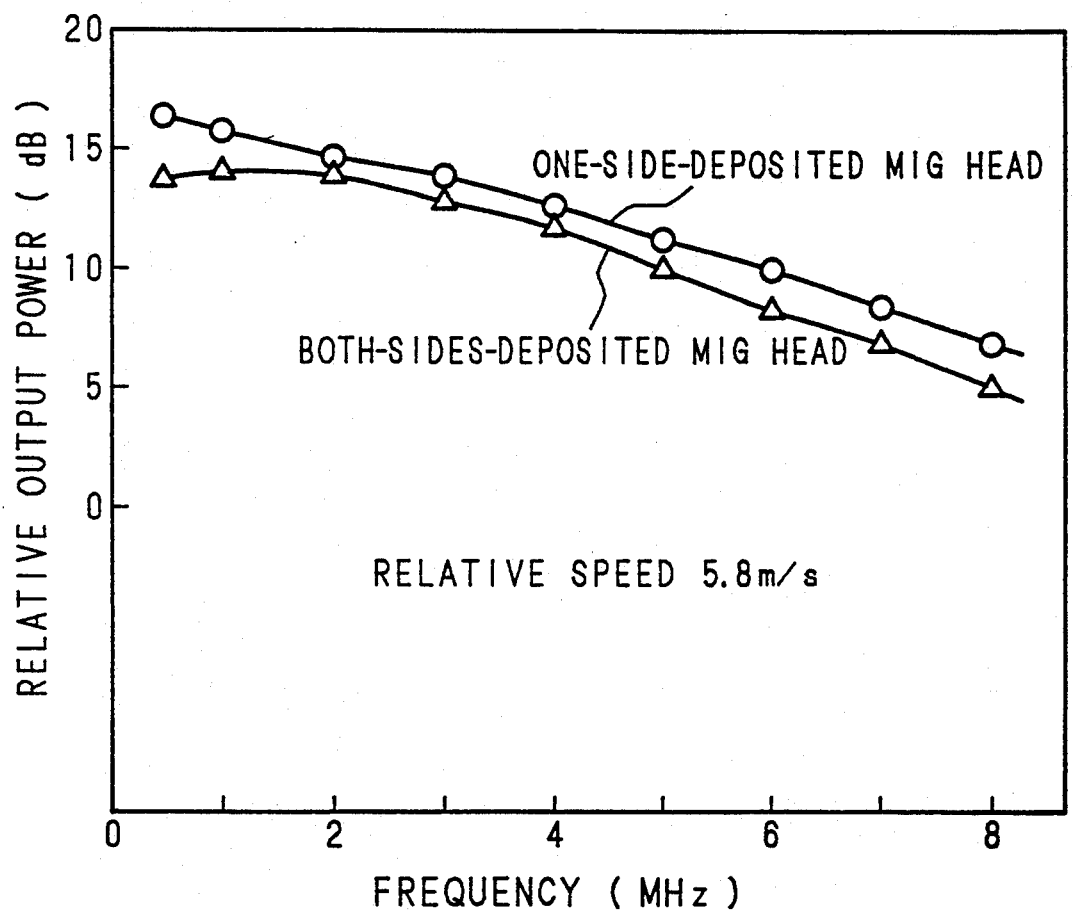
FIG. 13 is a graph of the frequency characteristic of a conventional both-sides-deposited MIG head and a one-side-deposited MIG head of this invention.
Figure 14:
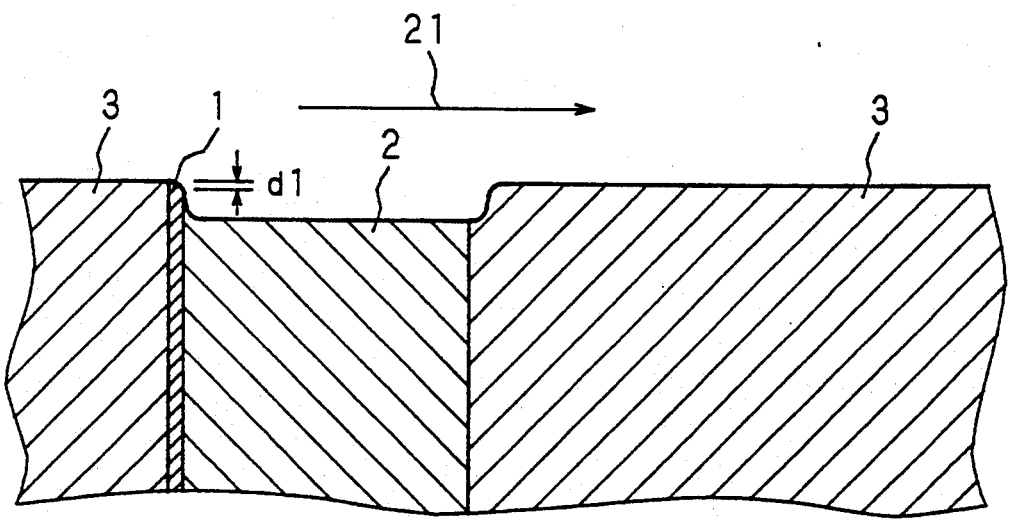
FIG. 14 is a side sectional view showing the state where the one-side-deposited MIG head of this invention is worn.

Output characteristics of the MIG heat of this invention having the metal film 2 formed only at the trailing side of the magnetic tape being manufactured in the above-discussed manner (referred to as a "one-side-deposited MIG head" hereinafter) and that of the conventional MIG head having the metal film formed both at the leading side and at the trailing side of the metal tape (referred to as a "both-sides-deposited MIG head" hereinafter) are compared with each other in the experiments and simulations. As a result of the comparison, as shown in FIG. 13, the one-side-deposited MIG head represents superior characteristic of playback outputs in a high frequency band to that of the both-sides-deposited MIG head. The difference is expressed by the equation (1) described earlier. In other word, as shown in FIG. 11, a spacing d1 of the one-side-deposited MIG head is substantially zero on the gap 1, while a spacing d of the both-sides-deposited MIG head is 200 Å as in FIG. 4 Therefore, the playback outputs of the both-sides-deposited MIG head are smaller by the spacing loss. Moreover, the playback outputs of the one-side-deposited MIG head are also larger in a low frequency band. This is because the recording depth is deeper in the one-side-deposited MIG head.

Figure 15:
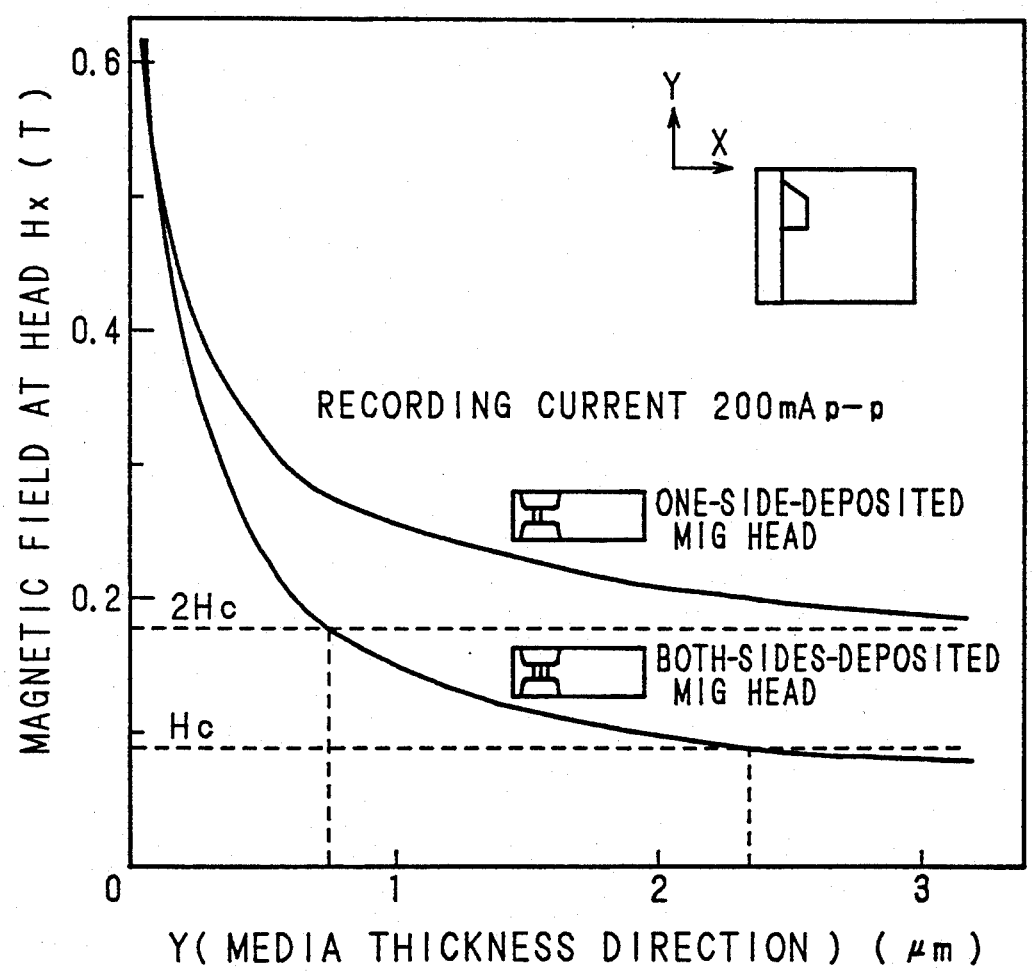
FIG. 15 is a graph of the strength of the generated magnetic field in the conventional both-sides-deposited MIG head and one-side-deposited MIG head of this invention.

The results of the simulations are indicated in a graph of FIG. 15, wherein Hc indicates the coercive force of the S-VHS tape. As is clear from the graph, the one-side-deposited MIG head is able to generate a magnetic field necessary for recording deeper in the medium. Accordingly, the one-side-deposited MIG head is superior in the electromagnetic transformation characteristic. Furthermore, the one-side-deposited MIG head is also superior in the overwriting property, whereby the side cross talk is reduced at the overwriting time without guarding the recording pattern, e.g., in the economy mode of the S-VHS, with less edge noises in the image.

The following description is directed to the thickness of the metal film 2.

Figure 16:
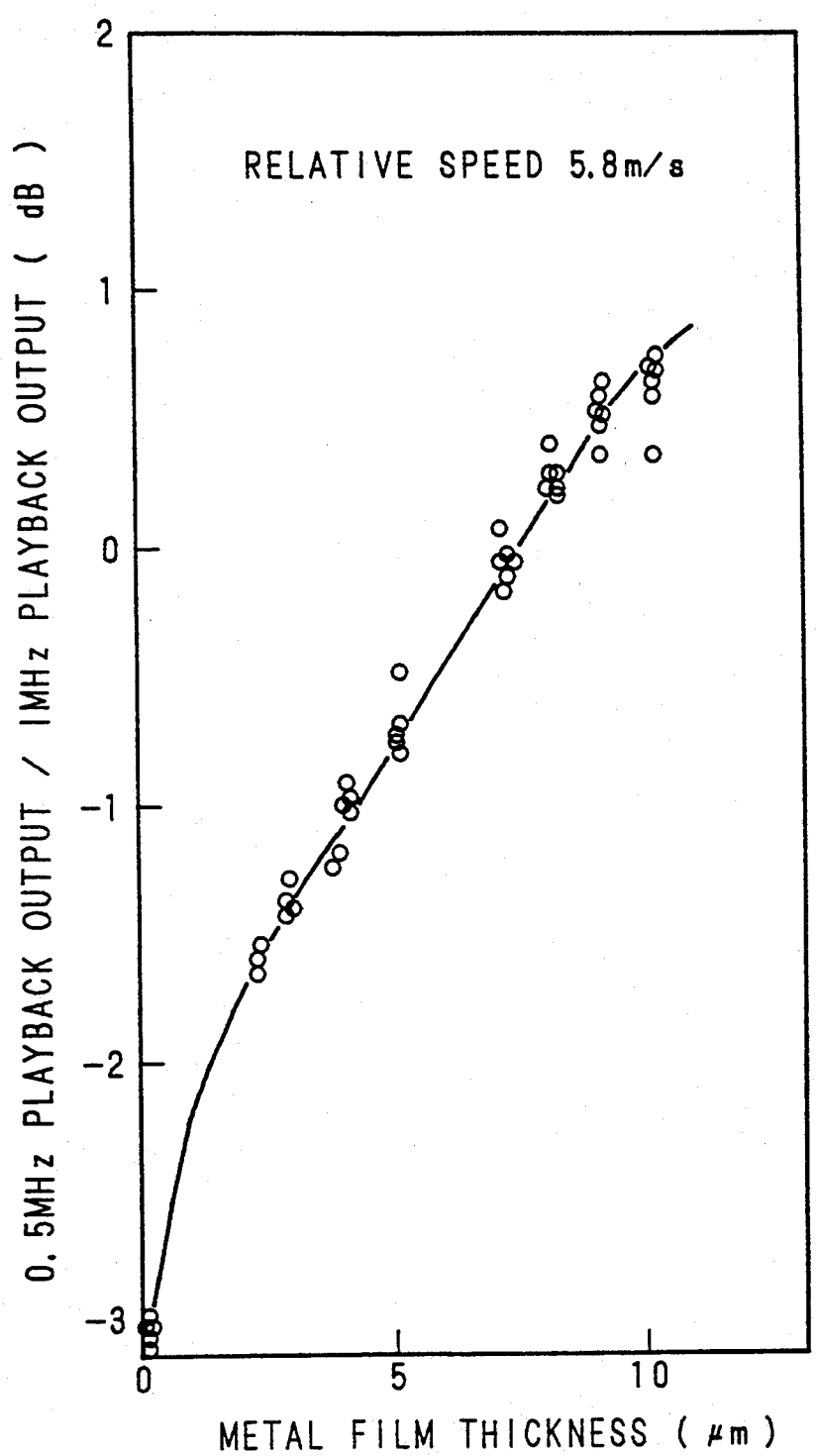
FIG. 16 is a graph showing the relation between (0.5 MHz playback output)/(1 MHz playback output) and the thickness of a metal film.

Playback outputs are measured for various kinds of MIG heads having different thicknesses of the metal film 2. It is found out that the magnitude of the output in a low frequency band is dependent on the film thickness. FIG. 16 indicates the relation between the output magnitude ratio of 1 MHz/0.5 MHz and the film thickness when the relative speed is 5.8 m/s. It is clear from the graph hat the necessary film thickness is not thinner than 5 $\mu$m for realizing sufficient recording under 0.5 MHz, and 3 $\mu$m at the minimum.

Similar experiments are conducted for heads having the metal film 2 of sendust. When the thickness of the sendust film exceeds 20 $\mu$m, the incidence of the debonding of the film rapidly increases although it depends a little on the film thickness and material of the intermediate film. However, the debonding occurs not at the boundary surface but the film accompanying the ferrite of about 10 $\mu$m thick separates from the head. Therefore, the debonding is caused not by the degree of the bond strength of the film, but because the ferrite is broken when the stress of the sendust film is over a predetermined amount. This criticality of the stress corresponds to the film thickness 20 $\mu$m of the sendust film.

Discussed hereinafter is related to the bonding temperature and intermediate film.

Figure 17:
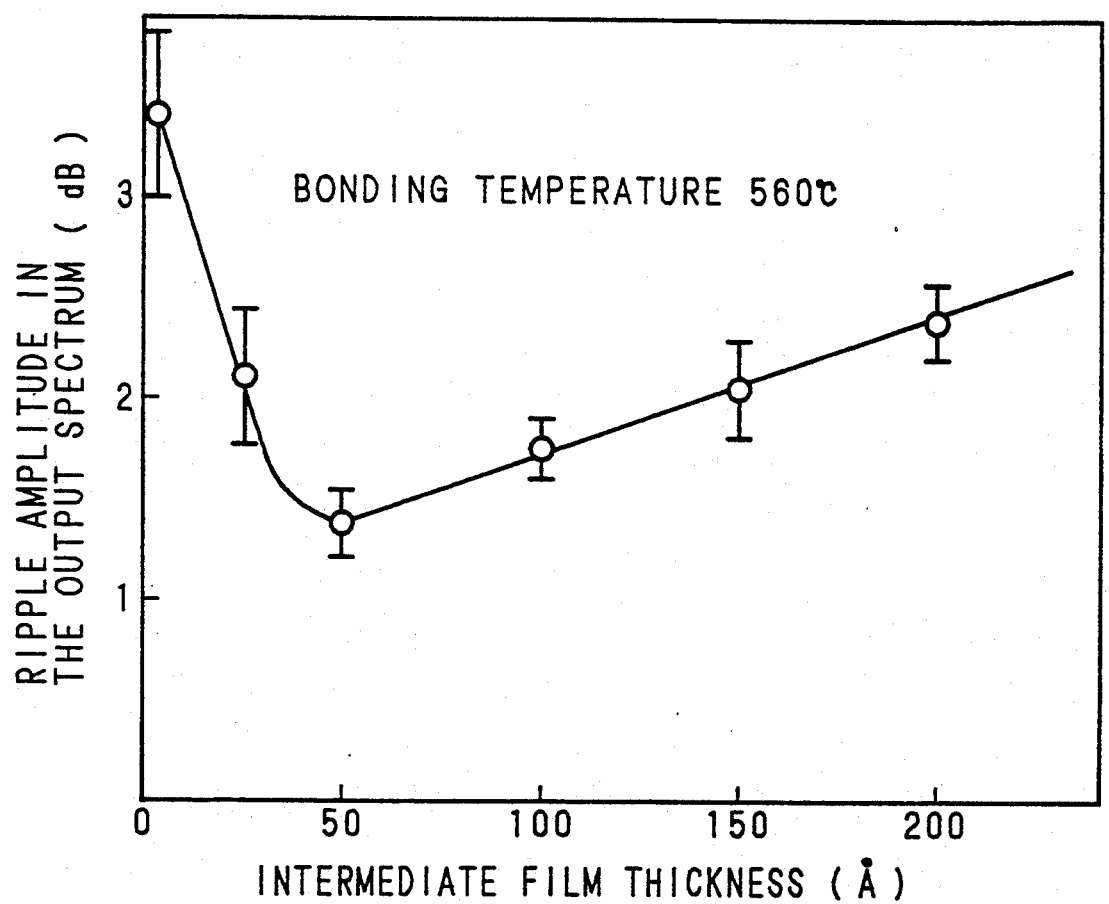
FIG. 17 is a graph showing the relation between the thickness of an intermediate film and ripple amplitude in the output spectrum.

The boundary surface of the metal film 2 and ferrite half works as a pseudogap in the MIG head. This pseudogap effects an image of analog video signals to be a ghost image. In order to avoid the false signal, it is not enough that the boundary surface between the metal film 2 and ferrite half is not parallel to the gap 1, and moreover the pseudogap itself should be excluded. FIG. 17 shows the relation between the film thickness of the intermediate film and the magnitude of the false signal, from which it is understood that the most suitable thickness of the intermediate film is 50 Å. Since the thickness of such a very thin film as this actually varies to some extent, the central thickness about 100 Å is desirable.

Figure 18:
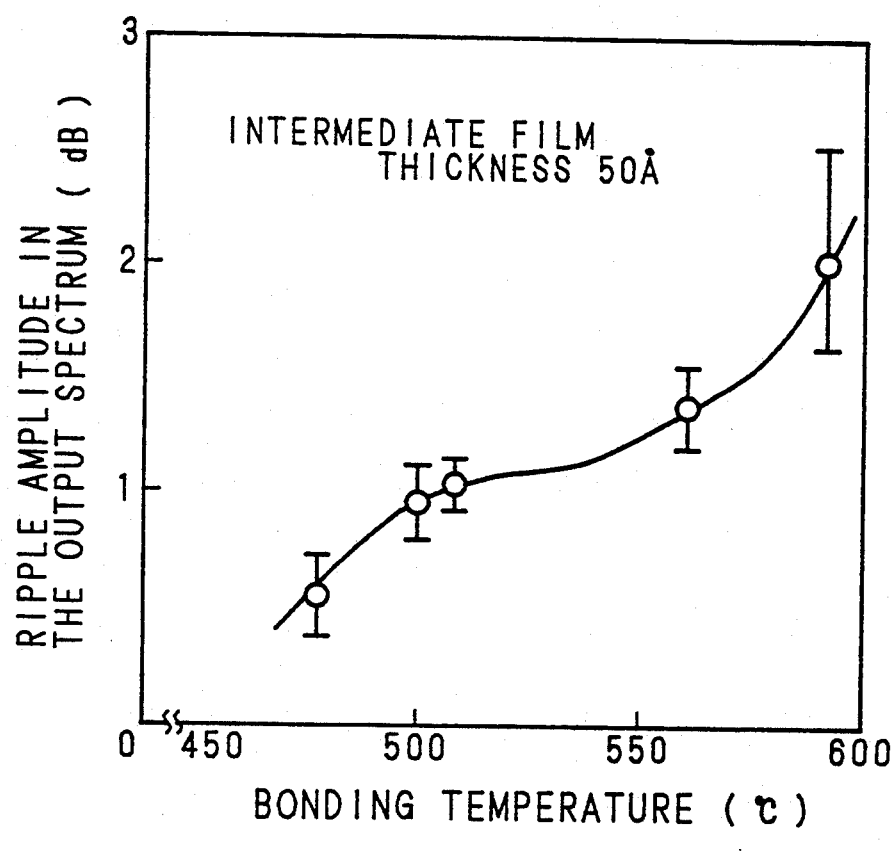
FIG. 18 is a graph showing the relation between the bonding temperature of ferrite block halves and ripple amplitude in the output spectrum.

Referring to FIG. 18 showing the relation between the bonding temperature of the ferrite block halves 8, 11 and the magnitude of the false signal, the lower the bonding temperature, the better the result. It is to be noted here that FIGS. 17 and 18 indicate the values obtained when the boundary surface is parallel to the gap 1, and therefore, when the boundary surface is not parallel to the gap 1 as in these experiments, values result in smaller. Accordingly, the bonding temperature is desirable to be not higher than 560° C., more desirable not higher than 510° C.

Figure 19:
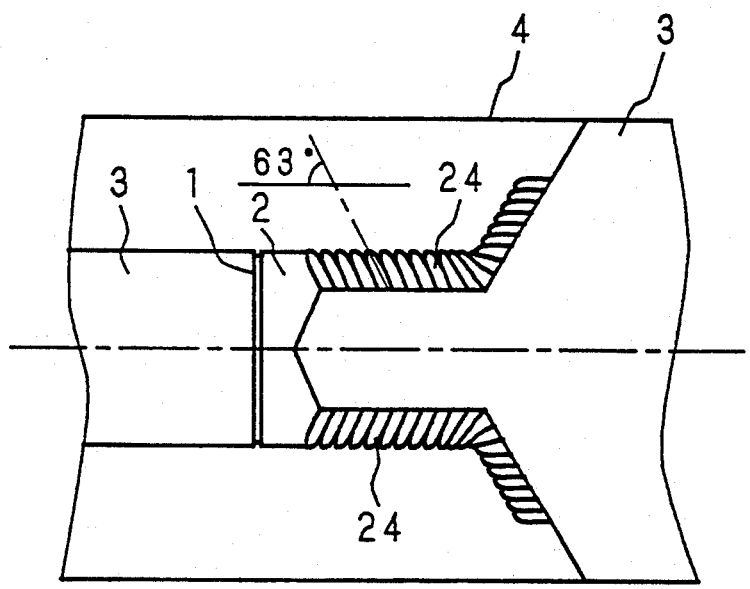
FIG. 19 is an enlarged view of the side surface of a track showing the stale of the sendust grain boundaries.

Next, necessity of removing the metal groove 2 at the side face of the groove for restricting the width of a track will be explained. Ferrite represents such magnetic property that greatly depends on the stress, with a large magnetostrictive constant. Therefore, when the metal film 2 remains at the side face of the groove, the magnetic property of the ferrite at the track portion is deteriorated by the film stress, whereby the magnetic resistance increases and the playback efficiency of the head lowers. In the case where the metal film 2 is made of sendust, the grain boundaries 24 of the sendust at the track grow slantwise as viewed from FIG. 19, so that the magnetic property of the metal film 2 considerably worsens by the configurative and magnetic anisotropy energy. Therefore, the metal film 2 is desirable to be removed from the side face of the groove for restricting the width of a track.

In order to satisfy the foregoing conditions, it is necessary to machine the groove 10 for restricting the track width after the metal film 2 is formed on the ferrite as in the above-described embodiment.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A magnetic head comprising:
   a first magnetic core made of an oxide magnetic compact,
   a second magnetic core made of an oxide magnetic compact having a protrusion confronting said first magnetic core, said protrusion having an end face coated with a metal film of high saturation flux density forming a boundary therebetween,
   a non-magnetic gap member interposed between said first and second magnetic cores thereby providing a gap between said first magnetic core and said metal film of the second magnetic core,
   a bonding material for bonding said first and second magnetic cores,
   wherein the boundary between said metal film and the end face of said protrusion of the second magnetic core defines a line which is transverse to said gap, and
   wherein the first magnetic core has a protrusion having a flat end face parallel to said gap member.

2. A magnetic head as set forth in claim 1, wherein said second magnetic core is coated only at the end face of the protrusion thereof with the metal film.

3. A magnetic head as set forth in claim 1, wherein said metal film has a surface, for contact with a magnetic tape having an area with a center defined by the direction of movement of the magnetic tape, and which is thinnest at the center thereof and thickest at both ends thereof.

4. A magnetic head as set forth in claim 3, wherein said metal film is not thinner than 3 $\mu$m and is not thicker than 20 $\mu$m.

5. A magnetic head as set forth in claim 1, wherein the metal film has a surface for contact with a magnetic tape having an area with a center defined by the direction of movement of the magnetic tape, and which is substantially symmetric about the longitudinal center of the gap.

6. A magnetic head as set forth in claim 1, wherein said boundary is formed by an intermediate film which is not narrower than 50 Å and not wider than 200 Å.

7. A magnetic head comprising:
   a first magnetic core made of an oxide magnetic compact which has a protrusion having a flat end;
   a second magnetic core made of an oxide magnetic compact which has a protrusion having a wedge-shaped end;

a non-magnetic gap member formed on the flat end of the first magnetic core; and a magnetic metal film of high saturation flux density formed between the gap member and the wedge-shaped end of the second magnetic core.

8. A magnetic head as set forth in claim 7, wherein said second magnetic core is coated with the metal film only at the end of the protrusion thereof.

9. A magnetic head as set forth in claim 8, wherein said metal film has a surface for contact with a magnetic tape having an area with a center defined by the direction of movement of the magnetic tape and which is thinnest at the center thereof and thickest at both ends thereof.

10. A magnetic head as set forth in claim 8, wherein said metal film is not thinner than 3 $\mu$m and is not thicker than 20 $\mu$m.

11. A magnetic head as set forth in claim 8, wherein the metal film has a surface for contact with a magnetic tape having an area with a center defined by the direction of movement of the magnetic tape and which is substantially symmetric about the longitudinal center of the gap.

12. A magnetic head as set forth in claim 9, further comprising an intermediate film formed between the metal film and the second magnetic core which is not narrower than 50 Å and not wider than 200 Å.

13. A magnetic head, comprising:
a first magnetic core made of an oxide magnetic compact;
a second magnetic core made of an oxide magnetic compact;
a non-magnetic gap member interposed between said first and second magnetic cores thereby providing a gap between the first magnetic core and the second magnetic core;
said first magnetic core having a protrusion with an end face which is parallel to said gap;
said second magnetic core having a protrusion with an end face which is transverse to said gap;
a metal film of high saturation flux density formed between said protrusion of the second magnetic core and the gap member; and
a bonding material for bonding said first and second magnetic cores.

14. A magnetic head as set forth in claim 13, wherein said second magnetic core is coated with the metal film only at the end face of the protrusion thereof.

15. A magnetic head as set forth in claim 14, wherein said metal film has a surface for contact with a magnetic tape having an area with a center defined by the direction of movement of the magnetic tape and which is thinnest at the center thereof and thickest at both ends thereof.

16. A magnetic head as set forth in claim 15, wherein said metal film is not thinner than 3 $\mu$m and is not thicker than 20 $\mu$m.

17. A magnetic head as set forth in claim 14, wherein the metal film has a surface for contact with a magnetic tape having an area with a center defined by the direction of movement of the magnetic tape and which is substantially symmetric about the longitudinal center of the gap.

18. A magnetic head as set forth in claim 14, further comprising an intermediate film formed between the metal film and the second magnetic core which metal film is not narrower than 50 Å and not wider than 200 Å.

19. A magnetic head, comprising:
a first magnetic core half, made of an oxide magnetic compact and having a protrusion with a flat end face,
a second magnetic core half, made of an oxide magnetic compact and having a protrusion with a wedge-shaped end,
a non-magnetic gap member formed on and contiguous with the flat end face of the first magnetic core half,
a magnetic metal film of a high saturation flux density formed on and contiguous with both the gap member and the wedge-shaped end of a second magnetic core.

* * * * *